R. R. VALE.
PNEUMATIC VEHICLE TIRE.
APPLICATION FILED DEC. 30, 1918.
1,335,469. Patented Mar. 30, 1920.
4 SHEETS—SHEET 3.
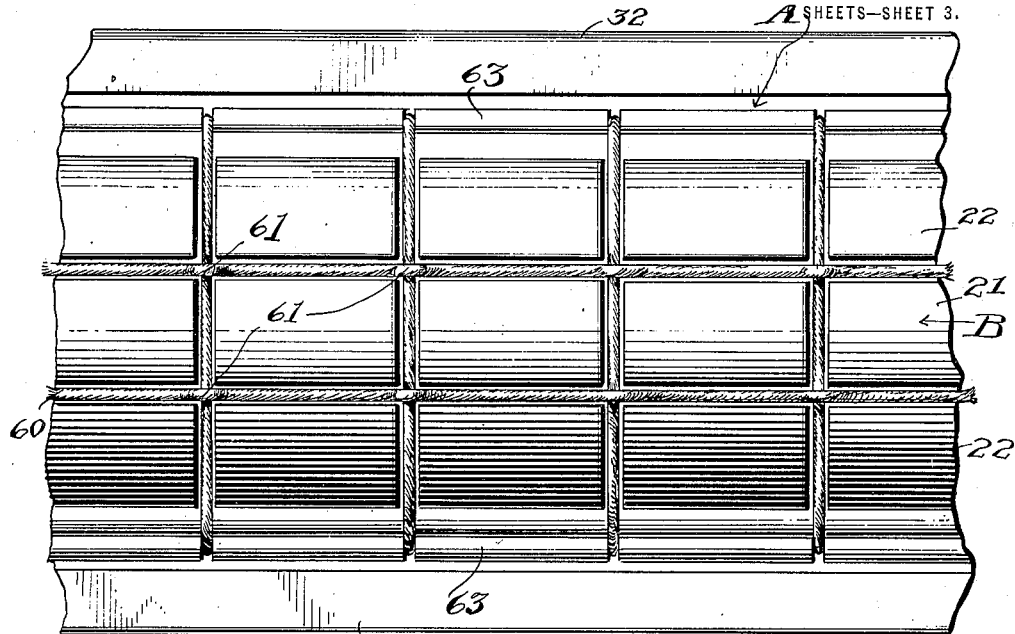
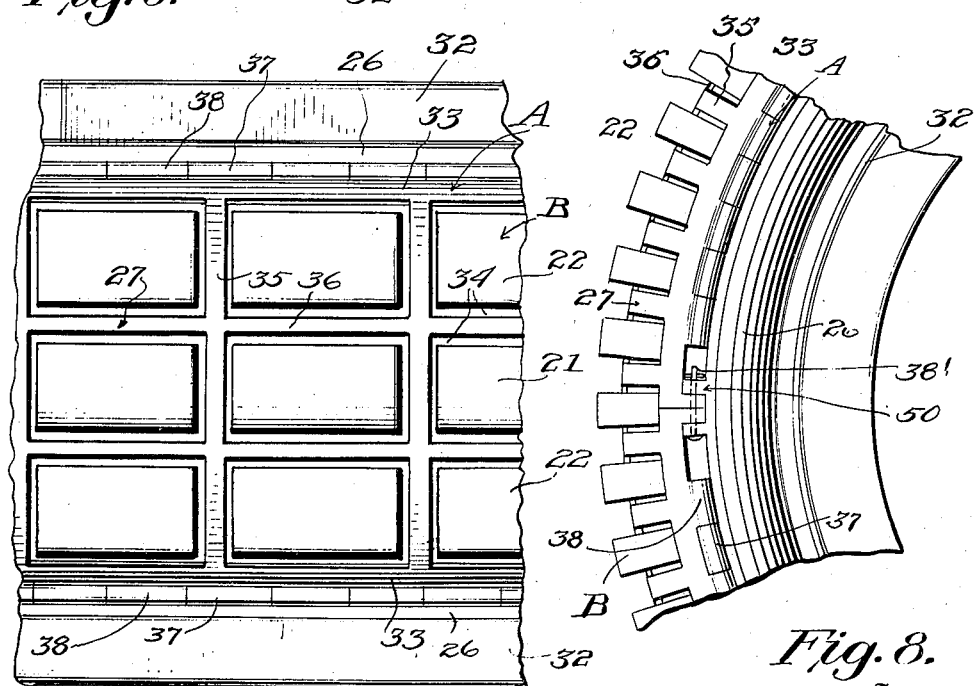

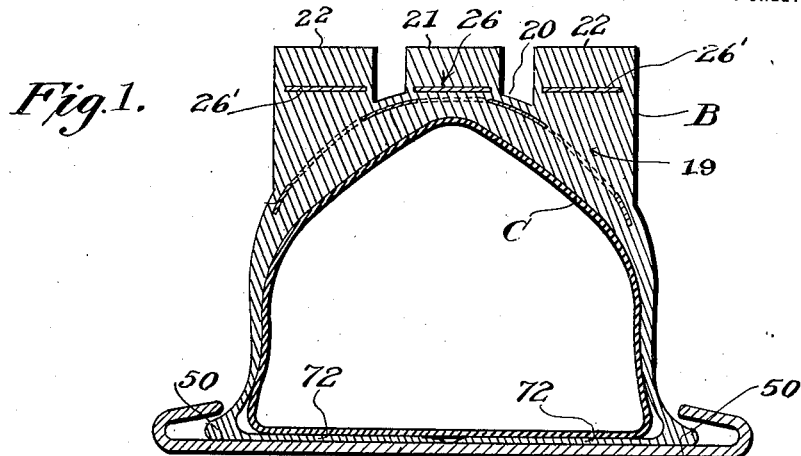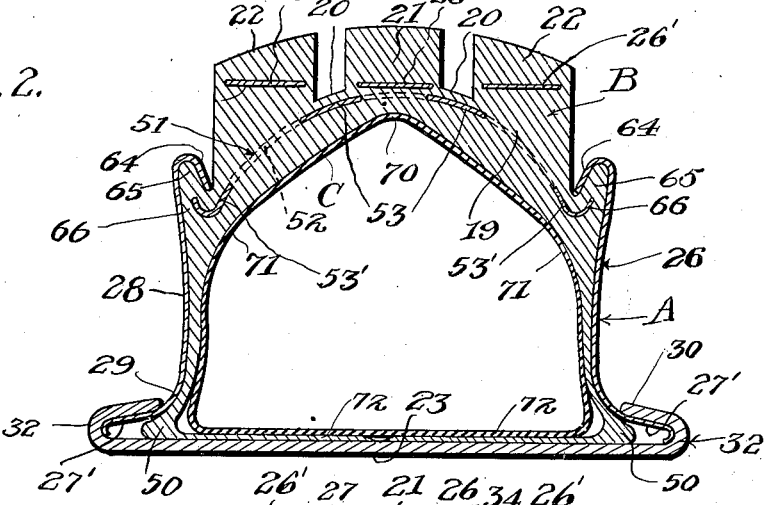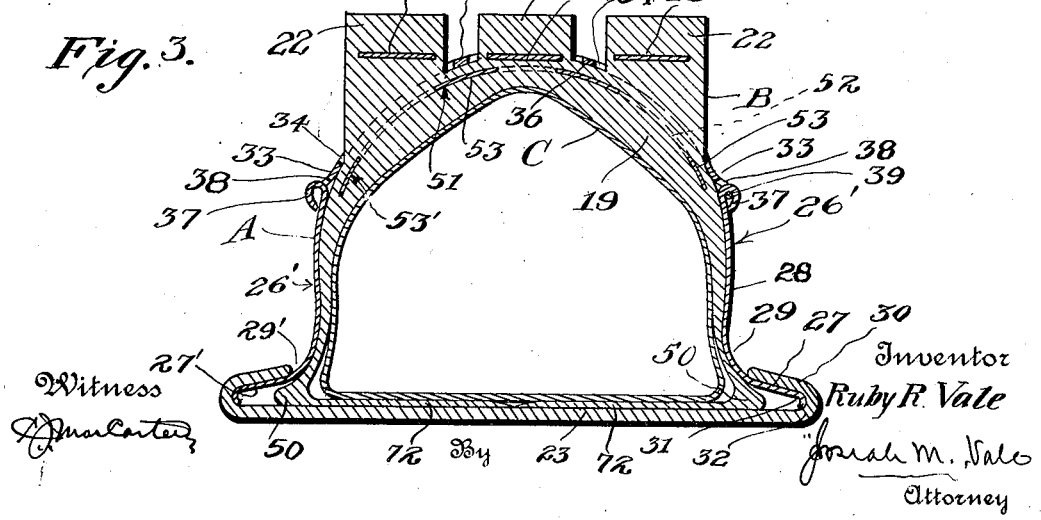

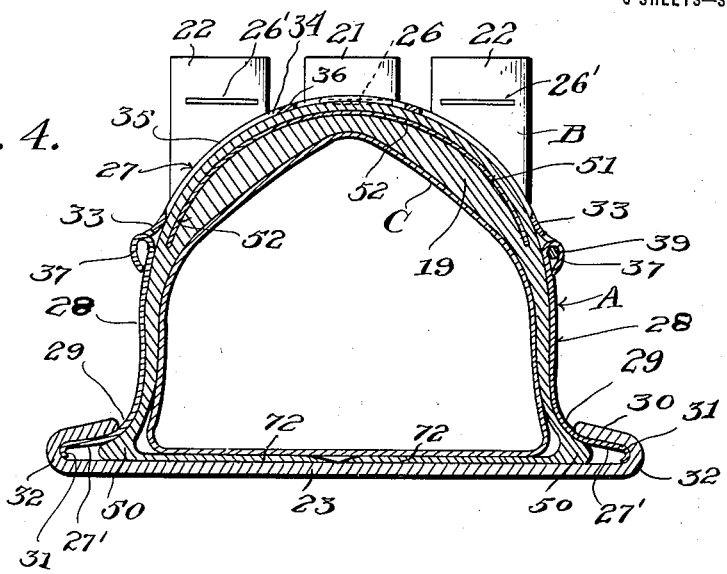

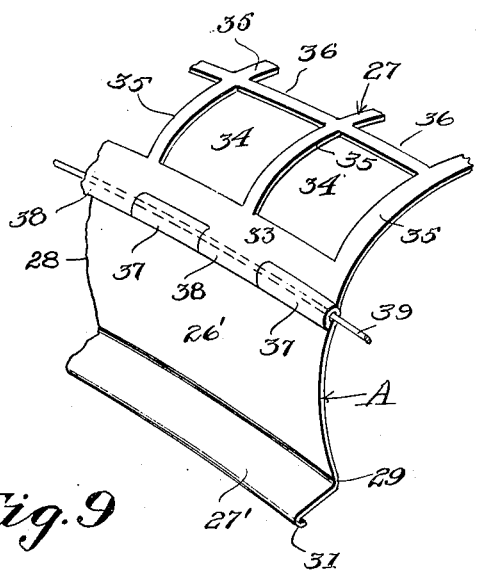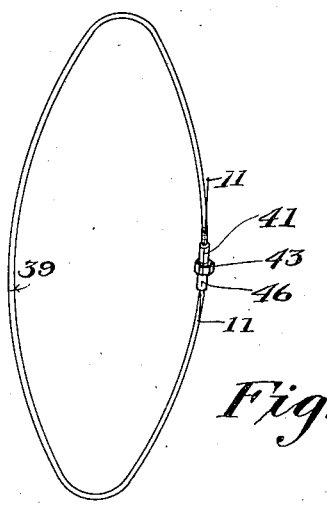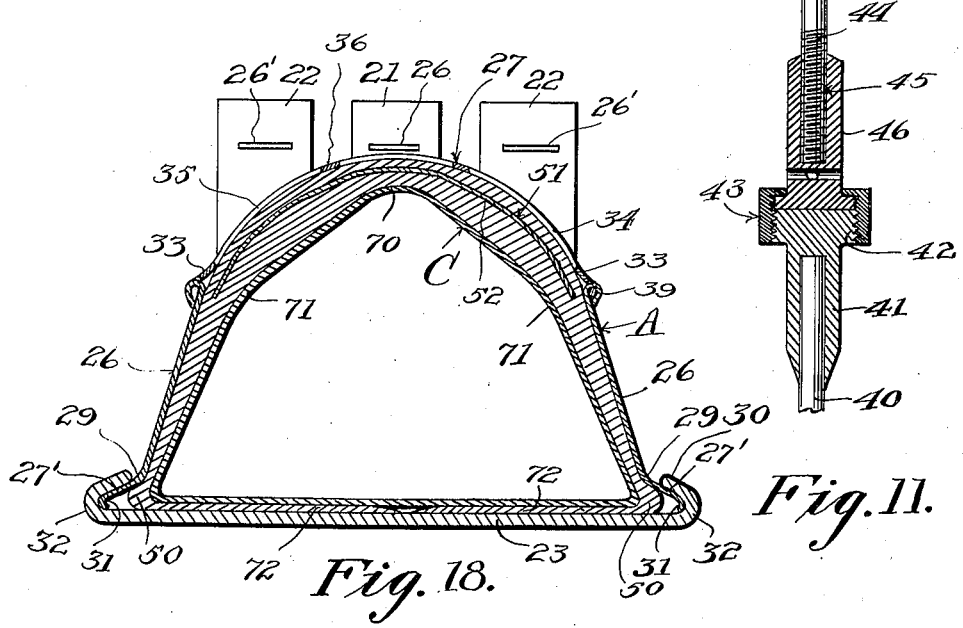

R. R. VALE.
PNEUMATIC VEHICLE TIRE.
APPLICATION FILED DEC. 30, 1918.
1,335,469.
Patented Mar. 30, 1920.
6 SHEETS—SHEET 5.
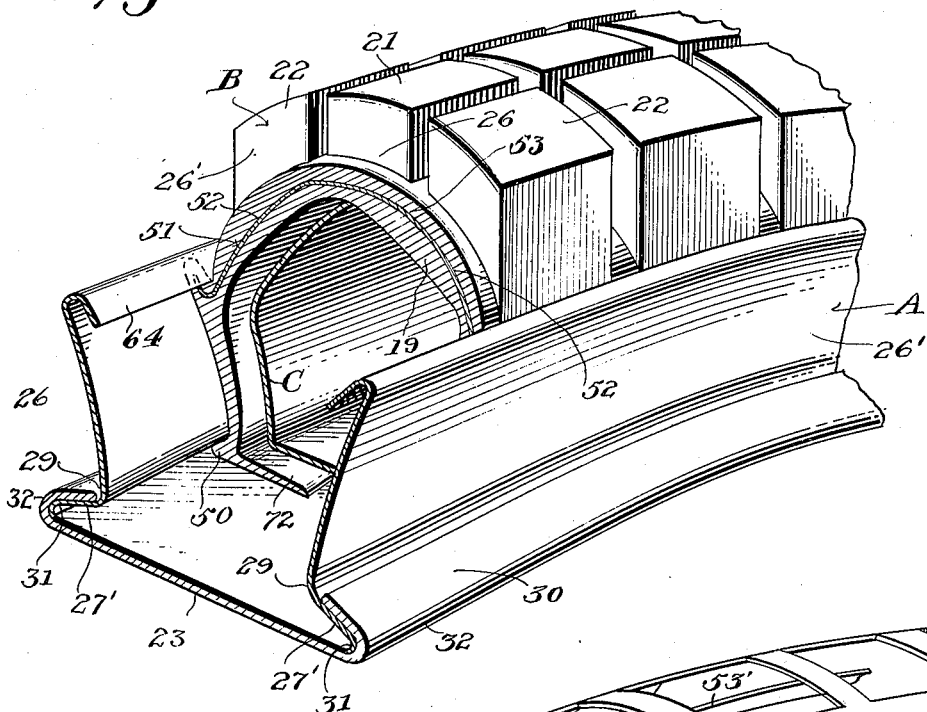
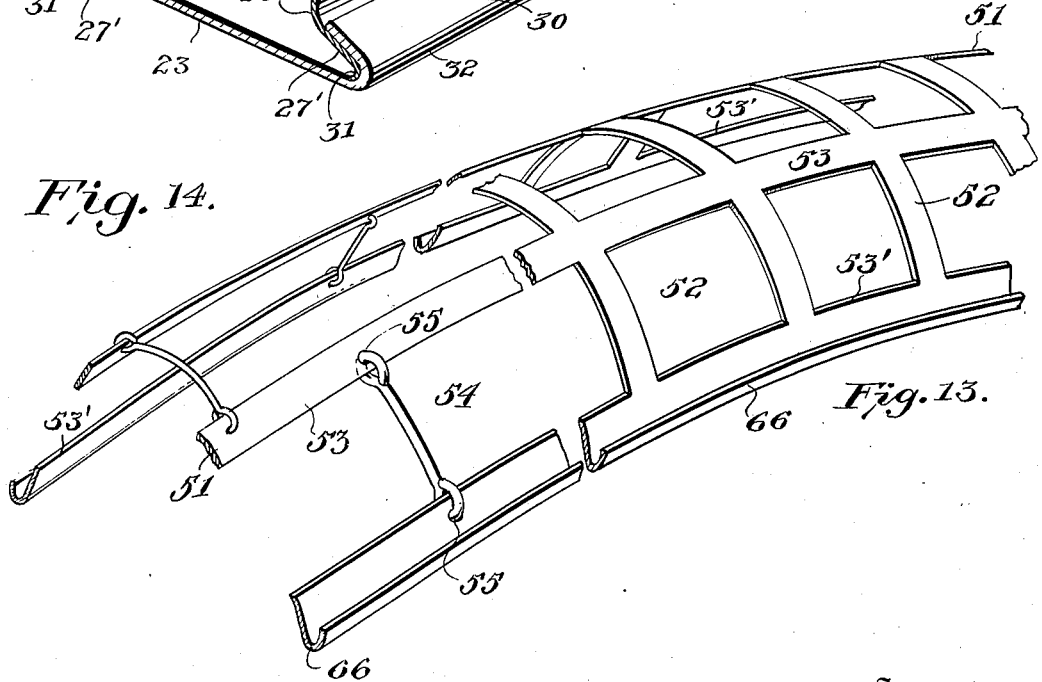
Witness
Inventor
Ruby R. Vale
By
Attorney

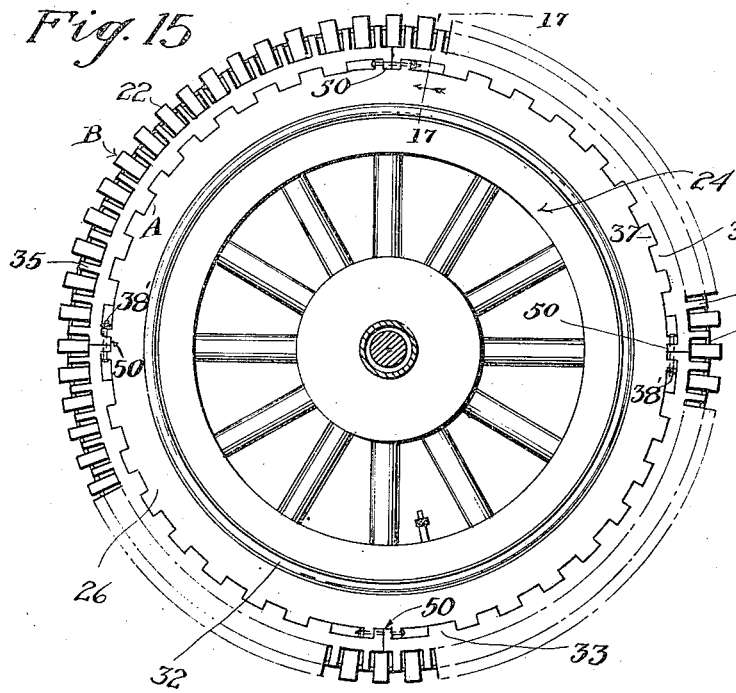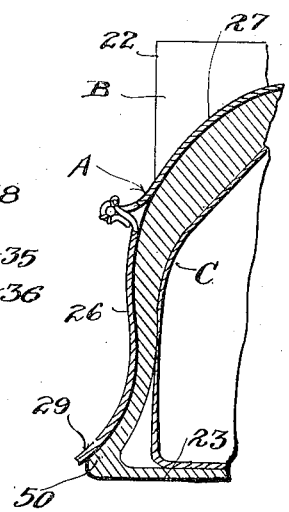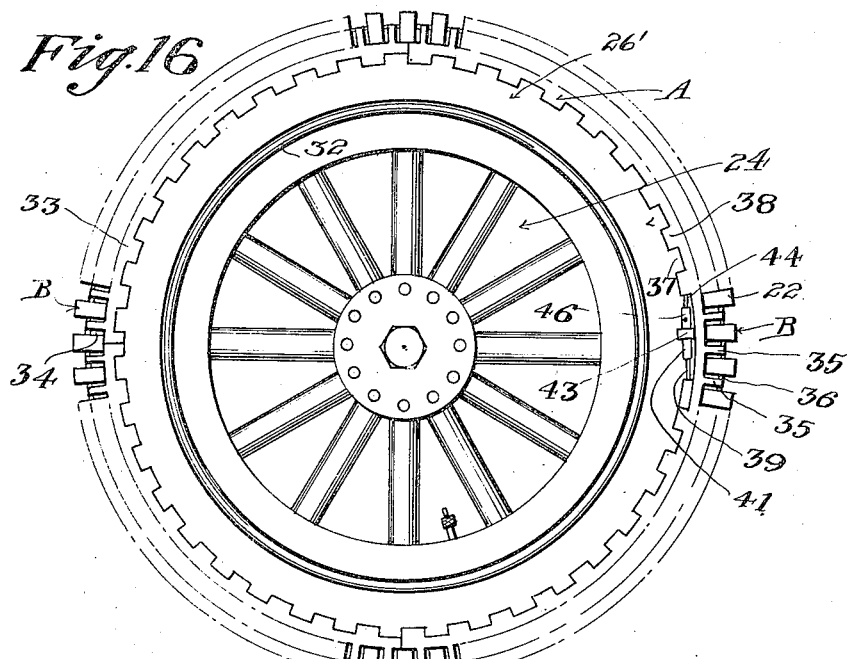

UNITED STATES PATENT OFFICE.

RUBY R. VALE, OF MILFORD, DELAWARE.

PNEUMATIC VEHICLE-TIRE.

1,335,469.   Specification of Letters Patent.   Patented Mar. 30, 1920.

Application filed December 30, 1918. Serial No. 268,861.

*To all whom it may concern:*

Be it known that I, RUBY R. VALE, citizen of the United States, residing at Milford, in the county of Sussex and State of Delaware, have invented certain new and useful Improvements in Pneumatic Vehicle-Tires, of which the following is a specification.

This invention relates to pneumatic tires suitable for use with either pleasure vehicles or with trucks of various capacities, and has for its principal object the provision of an improved tire so constructed as to be proof against puncture, blow-outs and rim cuts.

A further object is to provide for use on pneumatic tubes a demountable and replaceable tread, which shall free the side arcs and the rim portion of the tread from the inward pressure of the load, the outward pressure of the air chamber and the variable pressure of the side sway motion. These objects are attained by the mechanical means hereinafter described and claimed.

Pneumatic tires as now constructed cannot be made puncture proof and durable at reasonable cost. Three causes may be mentioned as contributing to this result.

In the present knowledge of the art, metal is essential, and this, in present construction, generates so much heat as to destroy fabric and rubber and impair the structure by separating the fabric from the rubber.

Tires require rigidity and tensile strength on the side arcs, as well as on the periphery of the outer incasement or casing, with the result that in the present construction, there is a destructive hinge-like motion as the side arcs rise and fall with the load.

The outside incasement or casing, which, as now constructed, is also the tread, puts the greatest strain on both the rim and the side arcs, thus failing to relieve these parts of the tire from the inward pressure of the load, the outward pressure of the air chamber and the variable pressure of the side sway.

The last named cause suggests the fundamental defect in the present method of construction, which defect lies in the failure to differentiate between and to separately provide for the two purposes and functions of the outside incasement or casing. These purposes or functions are as follows: (*a*) The incasement or casing serves the purpose of a tread, and a buffer between the point of ground contact and the inner tube which carries the load, and confines the side sway. (*b*) It further serves as a retainer for the air chamber or inner tube and acts as a restrainer of its constant outer pressure.

It is clear that this incasement or casing must be so constructed as to perform at any one point and at the same time, two different functions, that is, when the point of ground contact is reached, the outer incasement should so function as to rest on the air chamber and carry the load without any strain on its rim or side arcs, and at the same time should relieve the rim and side arcs from the inner pressure caused by the load and the outward pressure of the air in the inner tube; that is to say, at the point of ground contact it should resist the load's maximum inner pressure so as to free the rim and side arcs at this point from such inner pressure of the load.

Since the load of downward pull and of side sway, that is, the inward pressure, is maximum at the tire's point of contact with the ground and gradually decreases from this point, becoming minimum at a point diametrically opposite; and since the outward pressure is constant, it follows that the outer incasement or casing of present construction, consisting of one solid carcass, cannot perform these two different functions at one and the same time and point.

Hence, the outer incasement or casing must consist either of two distinct parts, or of one integral carcass so constructed, as to permit the two separate parts to perform the two different functions at one point and at the same time.

In the drawings,—

Figure 1 is a cross section of my tread shown mounted in a wheel rim.

Fig. 2 is a cross section detail of my retainer and tread of the preferred form of my invention, *i. e.*, without the top arc of the retainer.

Fig. 3 is a cross section detail of the retainer and tread with the top arc of the retainer.

Fig. 4 is a similar cross section detail of the retainer, shown in Fig. 3 but taken between the knobs of the tread.

Fig. 5 is a fragmentary perspective view of a further modification of my invention showing the retainer provided with a flexible top arc.

Fig. 6 is a plan view of the structure shown in Fig. 5.

Fig. 7 is a plan view showing the retainer provided with a rigid top arc.

Fig. 8 is a detail side elevation thereof.

Fig. 9 is a detail perspective view showing a portion of the connecting means of the side and rigid top arc.

Fig. 10 is a detail view of the outside connecting means removed.

Fig. 11 is a detail section taken on line 11—11 of Fig. 10.

Fig. 12 is a fragmentary perspective of the preferred form of my invention shown in cross section in Fig. 2.

Fig. 13 is a detail view of the reinforcing means used in connection with the construction shown in Fig. 12.

Fig. 14 is a detail view of a modification of the reinforcing means shown in Fig. 13.

Fig. 15 is a side elevation of my tire with the rigid top arc of the retainer looking toward the side of the wheel presented to the vehicle body.

Fig. 16 is a similar side elevation looking from the opposing side.

Fig. 17 is a detail section on the lines 17—17 of Fig. 15.

Fig. 18 on sheet 4 is a cross section showing a modification of several parts of my tire.

My invention consists of three distinct parts, each of which I believe to be novel in construction, as is also their combination. These parts are: A—the retainer or outer incasement hereinafter called retainer; B—the tread, hereinafter called tread; and C—the inner tube or air chamber, hereinafter called tube.

The casing B is illustrated in Fig. 1 and consists of a body portion 19 having a rounded outer or top face 20, provided with the usual knobs or projections 21 and 22 which form the ground contact elements and may be either parallel to the metal rim 23 of the wheel 24, as in most of the figures, or the side knobs may be rounded, as shown in Figs. 5, 6 and 12, both forms being old in the art. In either form the knobs are each provided with a piece of metal 26′ or other material impervious to punctures, embedded in the knob at about the level of the juncture of the central knobs 21 and the top face 20. The knobs themselves are made of such material as to withstand wear and minor punctures.

The retainer A, Fig. 3, consists of two side pieces 26 and a top or tread section 27, the three pieces together having the general shape of an arc of a circle, the diameter of which is determined by the load to be carried and the resiliency desired. The side pieces 26 have a relatively flat portion 27′ extending at an obtuse angle to the side 28 and joined to it by a smooth curve 29. The portion 27 follows the angle of the flange 30 of the metal rim 23 and has a sharply curved edge or bead 31 fitting snugly in the angle 32 of the rim, thereby holding the retainer securely thereto.

The top arc or tread section 27 has a margin portion 33 at either side but is provided with relatively large openings 34 of such size and shape as to readily receive the knobs 21, 22 and provide sufficient clearance to permit the ready removal of the retainers from the casings. The openings 34 form transverse strips 35 and longitudinal strips 36 which lie between the various knobs and add to the puncture proof qualities of the tire.

The top part 27 may be joined to the side pieces 26 by any desired construction, but with the employment of the rigid top arc I prefer to use on one side the hinge joint illustrated in Fig. 9, wherein the upper edge of the side arc 28 and the lower edge of the margin portion 33 are provided with hinge ears 37 and 38 which dove-tail into each other and are in alinement so as to receive a circle of spring wire 39, one end 40 of which is secured in an enlargement 41 threaded as at 42 to receive a union 43 coupling the two ends of the spring wire 39 together, the other end 44 having an adjustable threaded engagement 45 with a similar enlargement 46, also received by the union 43. This construction is shown in Fig. 16, which illustrates the side of the wheel farthest from the body of the vehicle.

On the opposite side of the wheel, that is, the side in proximity to the automobile body, the dove-tailing ears are not threaded through with a wire, although such construction may be used if desired. I prefer, however, to divide the top arc into quadrants or a greater number of sections and to hinge these sections to the side arcs at the appropriate number of places to permit the easy removal of the top arc of the retainer by turning the sections upon their hinges. As illustrated in Fig. 15, I provide four such hinges 50 which, under usual conditions, provide sufficient clearance to turn the top arcs on their hinges so as to be out of the way to permit access to the casing.

A metal reinforcing device 51, consisting of a plurality of transverse and longitudinal bars 52 and 53, respectively, is embedded in the material of the casing in such fashion that these bars shall underlie the reinforcing metal sheets 26 in each direction, so that these elements together shall form a complete puncture proof protection to the tire. In Fig. 14, the reinforcing elements 52 are replaced by wires 54 threaded through openings 55 of the transverse bars 53. In my preferred construction there will be a longitudinal bar 53′ just to the side of the edge of the last knob, the position of this reinforcing element being most clearly shown in Figs. 2, 12, 13 and 14, and serving to effectually prevent side punctures from above the side arc. My preferred casing is quite thick at its tread surface and gradually thins out to a point in proximity to the edge of the metal flange at which point it is considerably thickened, forming a bead 50 for reception between the metal rim and my retaining element A, this thickened bead preventing the pinching of the inner tube C.

In the modification shown in Fig. 5 of the drawings, the top arc portion of my retainer is made of flexible cables 60 passing between the various knobs and knotted together or otherwise joined as at 61 to form an integral structure having a marginal cable 62 of slightly greater strength adapted to be received beneath a down-turned edge 63 of the side arc 28, as clearly shown in the figure. In the use of this device it would be necessary to deflate the tire in order to secure the retainer in position.

In Figs. 2 and 12, wherein is shown the preferred form of my invention, I have eliminated the top arc of the retainer by increasing the rigidity and strength of the casing, and also by increasing to its maximum the height of the metal side arc 28, and by forming a down-turned flange 64 on the side arc so as to interlock with a corresponding flange 65 on the outer side of the casing, and integral therewith. In using this construction, the lower longitudinal embedded reinforcing strip 53', instead of being parallel to the arc as in Figs. 3 and 4, is curved as at 66 in Figs. 2 and 14 to strengthen the casing along the line of stress occasioned by the flange 64.

The purpose of the retainer is three-fold: It holds in place the casing, as this is indented as it comes in contact with the ground, and is pressed outward as it leaves the ground; and it also serves as an additional protection to the tread and to the inner tube against punctures and blow-outs. It relieves the rim and side arcs of the tread of all outward pressure of the air chamber and of all inward pressure of the load.

The functions of the retainer are: To remain constant in rigidity and fixidity so as to permit of the free inward and outward movement of the projecting knobs of the tread, as these approach, rest upon, and leave the ground; but in certain types of construction its top and side arcs should be sufficiently flexible as to respond to the varying pressure of air in the inner tube and the load carried.

The inside of the casing B need not exactly follow the contour of the retainer, but will preferably more closely follow that of an isosceles triangle with rounded apex 70 and slightly concave sides 71; the apex being the center of the arc and the sides are the chords from such point to the edge or base of the retainer which rests on the rim of the wheel. At the base end of each leg of this triangular shaped tread, there are inside extension flaps 72 on which the inner tube C will rest.

The purposes of the tread B are to form the tread of the tire, to act as a buffer between the point of ground contact and the inner tube which carries the load, to hold the inner tube in its place, to prevent punctures, rim cuts and blow-outs, to prevent skidding, to protect the inner tube from dust, dirt and water, and from chafing and pinching. Its function is for its inside to rest constantly on the inner tube with its concave legs pressing against the side arcs of the retainer and resting on the rim of the wheel, and its periphery pressing against the top arc of the retainer and a given strength of the tread moving in and out, as the projecting heels are pressed in and out, as they successively approach, rest upon, and leave the ground.

The inner tube C may be the ordinary inner tube now in use, but its shape more closely corresponds with the inside triangular shape of the tread. As the arc approaches a circle, and becomes less triangular, resiliency will result.

What is claimed is:

1. A rim having an inwardly directed flange on either side, a pair of side retainers engageable with said flanges at their lower ends, a casing lying in contact with the face of the rim and the inner face of the side retainers, and means engageable with the upper end of said side retainers for holding the casing to the rim.

2. A rim having its side portions inturned, a pair of retainers one on either side of said rim and engageable with said inturned side thereof, an inner tube, a casing having side portions engaging the retainers and having inwardly extending flaps lying against and intermediate the face of the inner tube and rim, and means engageable with the upper extremities of said side retainers for holding the casing in place on said rim.

3. In a pneumatic tire, the combination with the rim and casing carried thereby, said casing having a plurality of circumferentially and transversely extending grooves in its tread surface, of a retainer inclosing said casing, said retainer consisting of removable side sections and a perforated tread section detachably secured to the side sections, the imperforate portions of said tread section being positioned in the grooves in the tread surface of the casing.

4. In a pneumatic tire, the combination with the rim, of the casing carried thereby, said casing having a plurality of circumferentially extending rows of projections on its tread surface, the projections being spaced from one another to form circumferentially and transversely extending grooves, a sheet of puncture proof material embedded in each of said projections, an arc-shaped perforated member of puncture proof material embedded in the body of the casing and having its perforated portions positioned beneath the sheets of material in the casing projections.

5. In a pneumatic tire, the combination with the rim, of the casing carried thereby, circumferentially extending flanges on the outer sides of the casing, flexible side retaining members for the casing detachably secured to the rim and having downturned flanges at their outer ends adapted to coöperate with the flanges on the sides of the casing, an arc-shaped member embedded in the body of the casing and up-turned flanges on the side edges of said arc-shaped member positioned in the flanges on the casing and underlying the flanges on the side retaining members.

6. In a pneumatic tire, the combination with the rim and casing carried thereby, of circumferentially extending flanges formed on the outer sides of the casing, and flexible retaining members for the sides of the casing, each detachably secured to the rim and each provided with a downturned flange adapted to coöperate with the circumferentially extending flange on the casing.

In testimony whereof I affix my signature.

RUBY R. VALE.